Feb. 16, 1943.  R. D. MacDONALD ET AL  2,311,117
AGRICULTURAL IMPLEMENT
Filed July 30, 1941  3 Sheets-Sheet 1
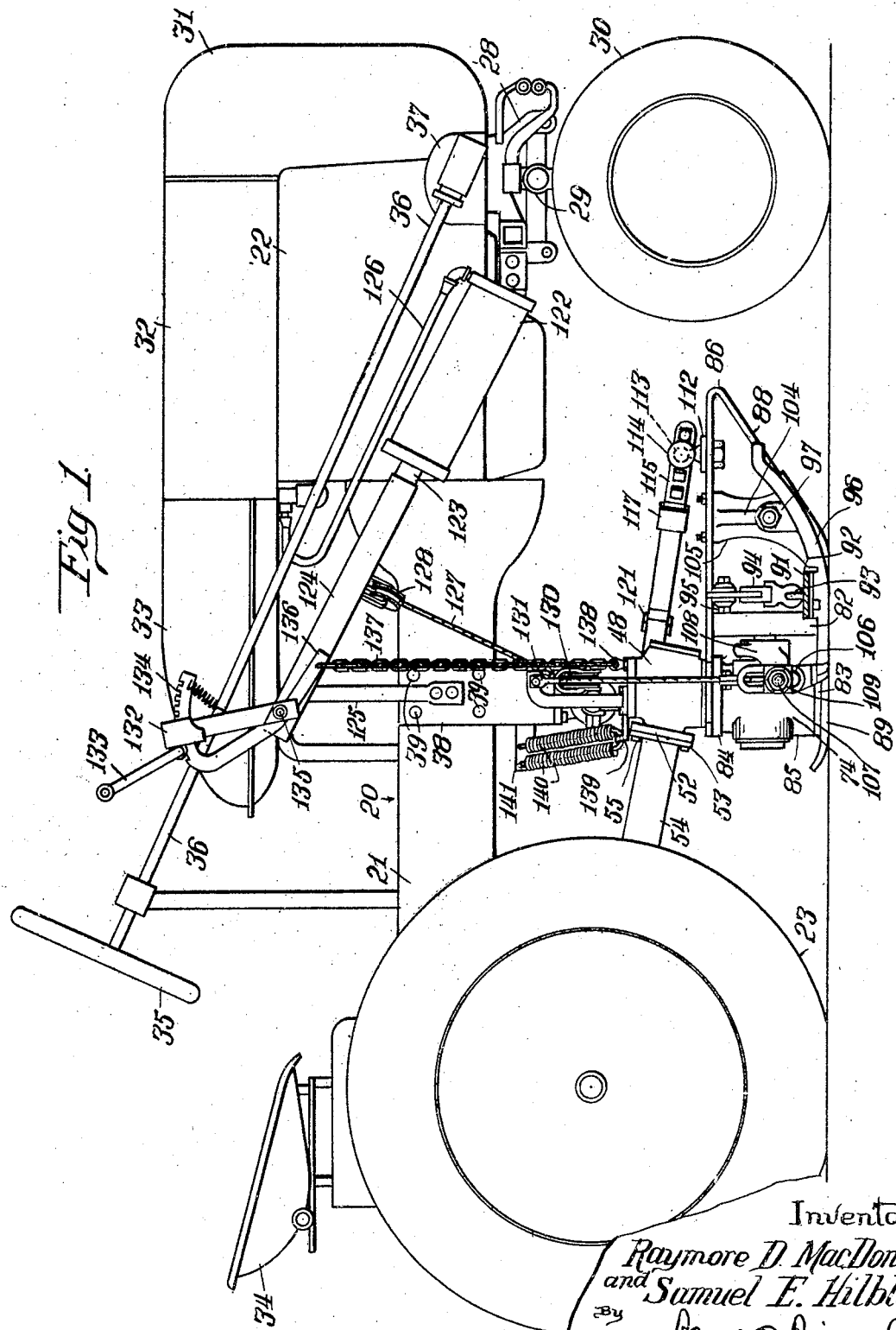

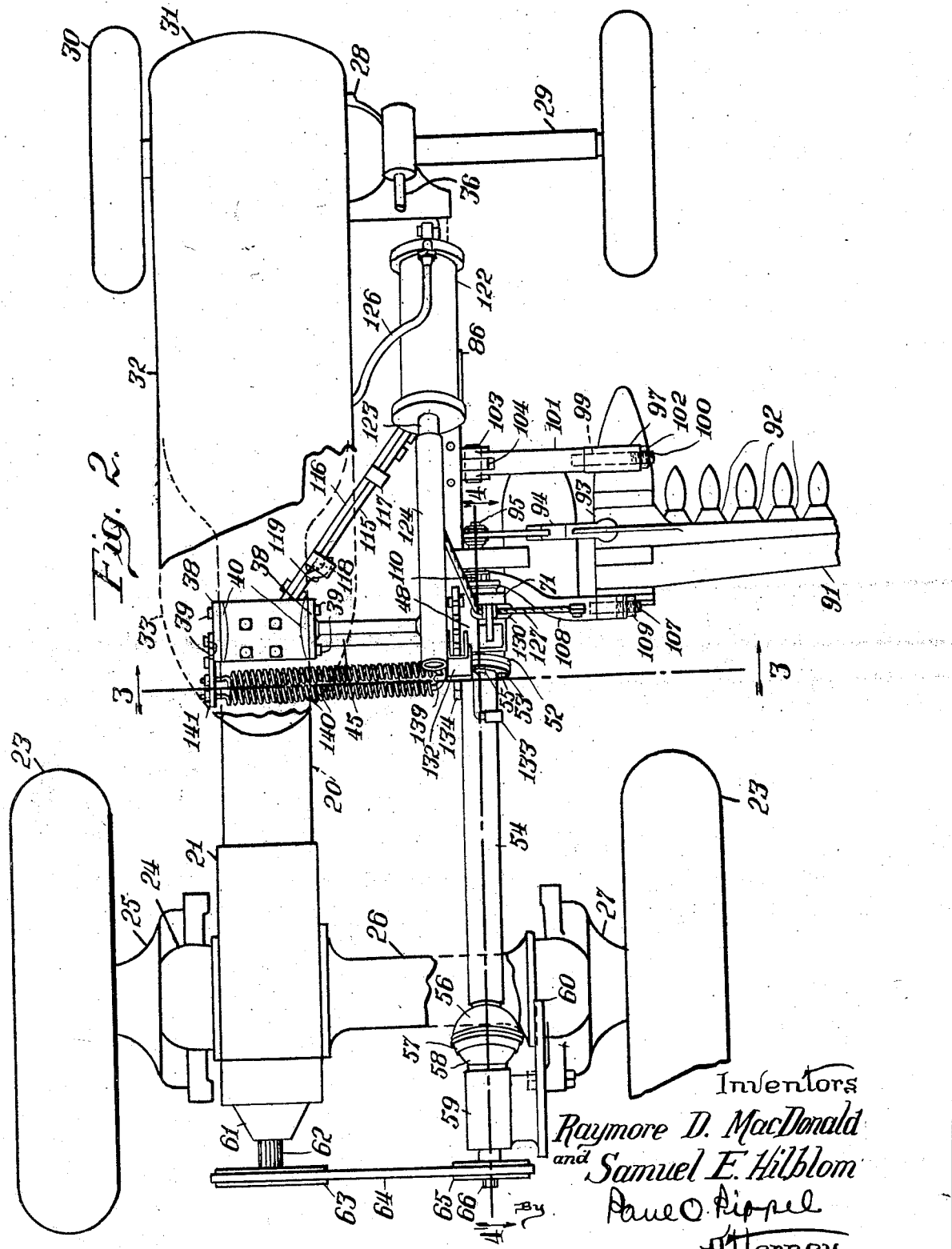

Feb. 16, 1943.   R. D. MacDONALD ET AL   2,311,117
AGRICULTURAL IMPLEMENT
Filed July 30, 1941   3 Sheets-Sheet 3
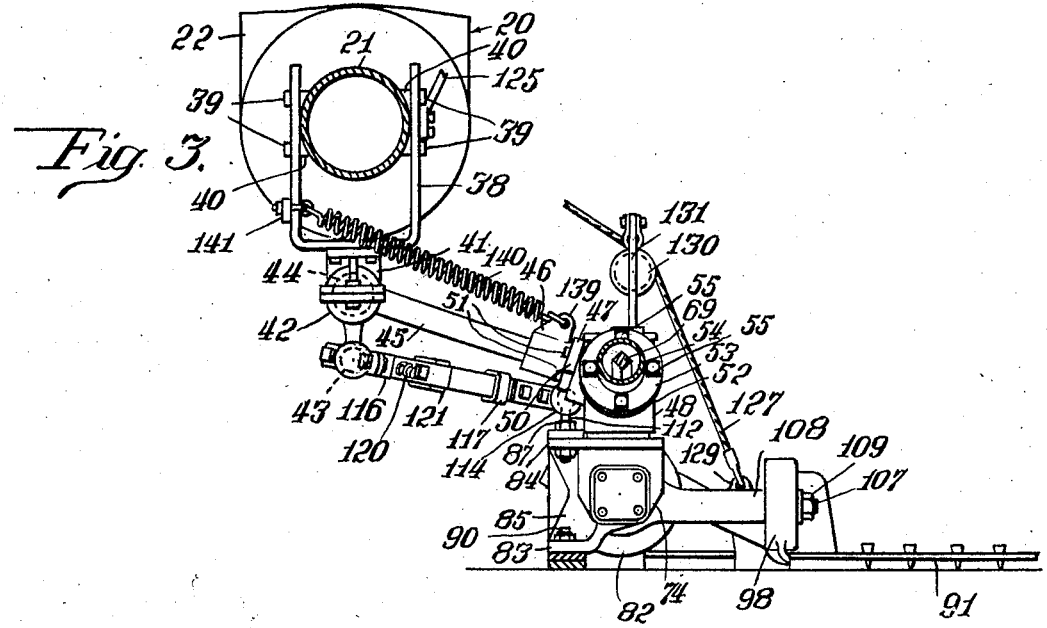
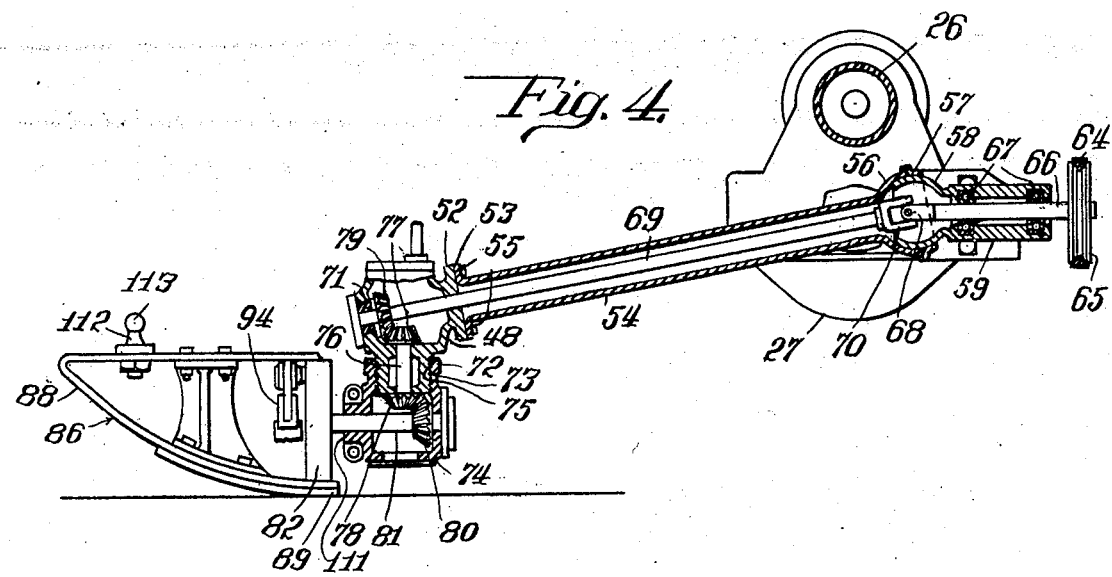
Inventors
Raymore D MacDonald
and Samuel E. Hilblom
By Paul O Pippel
Attorney Patented Feb. 16, 1943

2,311,117

UNITED STATES PATENT OFFICE 2,311,117

AGRICULTURAL IMPLEMENT

Raymore D. MacDonald, Battle Creek, Mich., and Samuel E. Hilblom, Chicago, Ill., assignors to International Harvester Company, a corporation of New Jersey Application July 30, 1941, Serial No. 404,648

24 Claims. (Cl. 56—25)

This invention relates to an agricultural implement and more particularly to an implement of the vehicle- or tractor-mounted type. Specifically, the invention pertains to a tractor-mounted mower.

In its broader aspects the invention provides for improvements in means for mounting agricultural implements on vehicles such as tractors or the like.

In its more specific aspects the invention is concerned with improvements in tractor-mounted mowers of the so called highway type. In a mower of this type a tractor, comprising generally a longitudinal body or frame, is carried on front and rear wheels and is provided at an intermediate portion of its body or frame with a supporting structure. Mower cutting mechanism is carried on this supporting structure intermediate the front and rear wheels, and the cutter-bar extends laterally from the tractor and supporting structure. A mower of this type differs in many important details from mowers of the trail-behind or draw-bar-mounted type. Although certain principles of the present invention may be adapted for the improvement of mowers of the two last-mentioned types, specific reference herein is made to a tractor mower of the highway type. Various problems of construction and operation are present in a highway mower that are not present in mowers of other types. However, the reference to a highway type mower is to be taken as indicative of a preferred embodiment of the invention and is not to be understood as in any manner limiting the invention in its broader aspects.

The principal object of the present invention is to provide an improved mounting means for the mounting of an agricultural implement on a wheeled frame, and particularly on a vehicle of the agricultural tractor type.

An important object is the provision of means for mounting a mower on a tractor.

Another important object is the provision of improved driving means for the operable mechanism of the agricultural implement, and particularly for the cutting mechanism of a mower.

Another object is the provision of a unitary frame structure providing a rigid support for an agricultural implement on a tractor.

Another object is to mount the frame structure on the tractor by means of universal coupling means, preferably in the form of ball and socket joints.

The invention seeks as another object to provide an improved ground-engaging member for an agricultural implement, and particularly for a mower.

Still another object is to provide an improved releasable structure for a mower of the type in which the cutter-bar is adapted to swing rearwardly upon the striking of an obstruction.

Still another object of the invention is to provide an improved adjustable means for mounting the cutting mechanism on the supporting structure.

And still another object is to provide an improved connection between the supporting structure and the cutting mechanism comprising means connecting the supporting structure and mower shoe for adjustment about an axis laterally of the mower.

Briefly, and specifically, these and other desirable objects are achieved in a preferred form of the invention by the provision of a mower structure which is adapted to be mounted or carried by a frame tractor. The tractor includes a generally longitudinally extending body or frame intermediate the front and rear wheels of which is carried a mower structure including a ground-engaging runner and a laterally extending cutter-bar. The ground-engaging member is carried by a supporting housing containing drive gearing by which the cutting mechanism is operated. The supporting housing is mounted on the tractor through the medium of two angularly related frame members connected to the tractor by means of ball and socket joints. One of the frame members is hollow or tubular and carries a drive shaft by which the power take-off shaft is connected to the cutting mechanism driving means contained in the supporting housing. The mower structure is mounted for rearward swinging movement about a vertical axis provided by the supporting housing. An improved releasable means including ball and socket joints is connected between the cutting mechanism and the tractor or mower supporting structure.

A more complete understanding of the principal features of the invention may be had from the following detailed description taken in conjunction with the accompanying sheets of drawings, in which:

Figure 1 is a side elevational view of a tractor-mounted mower constructed according to the principles of the invention;

Figure 2 is a plan elevational view of the same with the tractor illustrated in broken lines;

Figure 3 is a transverse sectional view taken substantially along the line 3—3 of Figure 2; and, Figure 4 is a longitudinal sectional view taken along the line 4—4 of Figure 2.

For the purposes of illustrating the preferred form of the present invention, there is shown in the drawings a tractor comprising a generally longitudinally extending body or frame 20 including a rear body or frame part 21 and a forward body or frame part consisting of a power plant or engine 22. The rear body part 21 serves as a transmission housing which carries suitable mechanism, not shown, for driving a pair of rear driving wheels 23. As best shown in Figure 2, the tractor is of the type in which the longitudinal center line of the body 20 is laterally offset to the side of the rear wheels 23, such as that disclosed in United States Letters Patent to Johnston et al., 2,221,546. The body part 21 carries at the left side thereof a comparatively short axle housing 24 connected by a depending final drive housing 25 to the left rear wheel 23. The other side of the body part 20 is provided with a relatively longer axle housing 26 similarly connected by a final drive housing 27 to the right rear wheel 23. The forward end of the body 20 is provided with suitable supporting structure generally indicated at 28 by which the front end of the body is supported on a transverse front axle 29 including steerable front wheels 30. The body further includes a forward grill 31, a hood structure 32, and a fuel tank 33. The rear end of the body includes an operator's station including a seat 34 immediately ahead of which is carried a steering wheel 35 connected by a steering rod 36 to suitable gearing, not shown, contained in a steering gear housing 37 located on the forward supporting structure 28. It will be understood of course that any suitable tractor structure may be utilized, and that the foregoing has been illustrated merely for the purposes of the present disclosure.

As best shown in Figures 2 and 3, the forward portion of the rear body part 21 of the tractor body is comparatively narrow. At this point the body part carries a supporting means in the form of a U-shaped supporting frame 38 rigidly secured by bolts 39 to mounting pads 40 disposed respectively at opposite sides of the body part. The transverse or under portion of the frame 38 carries rigidly thereon a depending bracket 41 which forms the upper complementary half of a supporting means comprising a universal coupling or mounting means including a socket and completed by a lower, complementary half 42. The lower half of the socket includes an integral depending portion provided with a ball 43. The socket halves 41 and 42 are rigidly secured together and enclose a ball 44 provided on the end of a transversely extending frame member or bar 45. The relation between the bar 45 and the socket is such that there may be substantial free relative movement between the two in the conventional manner of ball and socket joints. The bar 45 extends laterally of the tractor toward the right side thereof and comprises a part of a mower supporting structure to be presently described.

The right hand or outer end of the bar 45 carries rigidly thereon a connecting member 46 which is provided with an attaching flange 47. The bar is connected by this means to one part of a supporting housing or bracket structure, generally indicated at 48. As best shown in Figure 3, the housing 48 includes at its inner face an inclined attaching or supporting face or pad 50. This face fits the outer face of the flange 47, and the connecting member 46 and housing 48 are rigidly secured together by bolts 51 passing through the flange and face and into the housing. As best shown in Figure 1, the housing 48 includes a second attaching means in the form of a rear supporting or attaching face 52. This face 52 is formed as a circular flange and is adapted to be secured to a circular flange 53 preferably integral with the forward end of a longitudinally extending supporting member or frame bar 54. The flanges 52 and 53 of the parts 48 and 54, respectively, are rigidly secured together by a plurality of bolts 55.

As best shown in Figures 2 and 4, the supporting member 54 extends longitudinally rearwardly alongside of the tractor body part 21 to a point just below the right-hand axle housing 26. As shown in Figure 4, the rearward end of the member 54 is upset or enlarged to provide one half 56 of a socket, which is completed by a complementary half 57. These parts are rigidly secured together and encase a ball member 58 rigidly carried by a supporting bracket 59, thus forming a universal coupling or mounting means. The bracket 59 is rigidly carried by the axle housing 26 by means of a supporting plate 60 secured to the right-hand depending housing 27. As best shown in Figure 4, the member 54 is tubular or hollow. The ball member 58 is likewise hollow. This arrangement provides a torque tube means for bracing the mower structure and for enclosing part of the mower driving mechanism, referred to below.

As best shown in Figure 2, the rearward end of the rear body part 21 includes a housing structure 61 which extends longitudinally rearwardly and which carries power means in the form of a power take-off shaft 62. This shaft has keyed thereto for rotation therewith a drive pulley 63. A drive belt 64 is trained about the pulley 63 and about a smaller pulley 65 keyed to a shaft 66. The shaft 66 is journaled in suitable bearings 67 in the supporting bracket 59, previously described. The shaft is thus disposed longitudinally of the tractor at one side thereof, and its forward end extends within the hollow ball member 58. At this point the shaft is provided with one half of a flexible drive connection or universal joint 68. A drive shaft 69 extends longitudinally within the tubular member 54 and is provided at its rear end with a universal joint 70 which completes the flexible connection with the shaft 66. The forward end of the shaft 69 extends within the housing 48 and is journaled on a suitable bearing 71. As best shown in Figure 4, the housing 48 provides a combined gear and supporting housing, the purposes of which will presently appear.

The housing 48 has a vertically depending journal portion 72 which is generally cylindrical and which is formed about its outer surface with a plurality of threads 73. A second housing or support 74 includes an upper internally threaded portion 75 engaging the depending threaded portion 72 of the housing 48. The other housing parts have relative movement about the vertical axis of the portions 72 and 75. Housing structure of a similar type is disclosed in detail in United States Letters Patent to Raney et al., 2,166,967. The function of this structural relationship will hereinafter be more fully described. The vertical portion 72 on the housing 48 journals a vertical shaft 76 carrying at each end, respectively, bevel gears 77 and 78. The upper gear 77 meshes with and is driven by a bevel gear 79 carried on that portion of the drive shaft 69 which is enclosed in the housing 48. The lower gear 78 meshes with and drives a bevel gear 80 keyed to a longitudinally extending shaft 81, which is journaled in the lower housing part 74. The shaft 81 extends forwardly outside the housing part 74 and is keyed to a driving element in the form of a fly-wheel 82 comprising part of the mower driving mechanism to be subsequently referred to.

As best shown in Figures 1 and 3, the housing part 74 includes an integral lower flange 83 and an integral upper flange 84. These flanges are suitably connected by a reenforcing web 85 and provide supporting means for the mounting of a ground-engaging member or runner, generally indicated at 86. The member 86 preferably comprises a one-piece bar secured at its upper rearward end by bolts 87 to the upper flange 84 on the housing part 74. The bar then extends forwardly and is bent rearwardly and downwardly, as at 88, and then horizontally rearwardly to provide a ground-engaging portion 89 having an upturned rear end. The runner member 86 is thus adapted to engage the ground and to follow varying ground contour. The supporting structure, comprising the members 45 and 54 and the housing 48 and 72, is permitted to have comparatively free floating movement within wide limits because of the provision of the ball and socket joints mounted at the center of the tractor body and at the rear axle housing 26 of the tractor. The lower portion 89 of the runner is rigidly secured by bolts 90 to the lower flange 83 of the housing part 74. Thus, the runner and housing parts provide a rigid unitary structure adapted to carry the mower cutting mechanism.

The cutting mechanism comprises a laterally extending cutter-bar 91, which is provided with a cutting knife 92 of the usual type. The inner end of the knife 92 carries a knife-head 93, which may be and is here of conventional form, and which is connected by a driving member or pitman 94 to a drive pin 95 disposed eccentrically on the fly-wheel 82, previously described as being driven by the shaft 81 in the housing part 74. The inner end of the cutter-bar 91 is rigidly connected to a longitudinally extending mower shoe 96. The shoe is provided at its forward end with an upstanding ear 97 and at its rearward end with an integral upstanding bracket portion 98. The ear 97 is apertured on a transverse axis, as at 99, and is adapted to receive a laterally extending threaded portion 100 of a supporting arm 101. A nut 102 connects the portion 100 of the arm 101 to the ear 97 on the shoe 96. The arm 101 extends laterally inwardly of the shoe and is provided with a bifurcated inner end which is connected by a longitudinal pivot pin 103 to an ear 104 provided as an integral part of a supporting member or bracket 105 rigidly carried at a forward portion of the runner 86. The upstanding portion 98 at the rear of the shoe 96 is provided with a vertically extending, arcuate slot 106 formed about an axis coincident with the axis of the aperture 99 in the ear 97 on the forward end of the shoe. This slot receives a threaded member 107, comprising the outer end of a second laterally extending arm 108. A nut 109 cooperates with the threaded portion 107 to mount the arm 108 on the shoe 96 through the medium of the slotted bracket or portion 98. The arm 108 extends laterally inwardly and generally parallels the first arm 101. As best shown in Figures 2 and 4, the inner end of the arm 108 is formed as one half of a journal 110. This journal serves to carry the arm 108 on a forwardly extending bearing portion 111 formed integrally on a front side of the housing part 74. The bearing portion 111 is formed on an axis coincident with the axis of rotation of the shaft 81, as is the pivot pin 103 carried by the bracket 105 at the forward end of the runner 86. In this manner the cutting mechanism is carried for movement with respect to the housing part 74 about an axis longitudinally of and paralleling the tractor body 20.

Because of the threaded interconnection between the housing parts 48 and 74, it will be apparent that the cutting mechanism, which includes the housing part 74, may have movement with respect to the mower-supporting structure, which includes the housing 48, in a generally horizontal plane about the vertical axis between the portions 72 and 75 of the housing parts. Since this vertical axis is coincident with the axis of the vertical shaft 76, this swinging movement will not be attended by any disturbance of the gearing comprising the driving means for the cutting mechanism. During the normal operation of the mower, the cutter-bar extends laterally outwardly, as illustrated in the drawings. As a safety feature, the cutter-bar is mounted for rearward swinging movement about the aforesaid vertical axis when the cutter-bar strikes an obstruction or is otherwise opposed by an obstruction retarding its forward progress. In order that the cutter-bar may be normally locked against this rearward swinging movement and be held in its operative position, a release means is provided to connect a portion of the cutting mechanism structure and the tractor structure. One type of such means is illustrated in the drawings. A forward upper portion of the runner 86 includes rigidly thereon an upstanding bracket member 112 provided at its upper end with a ball 113. This ball is engaged by a sprocket 114 provided at one end of a rearwardly and diagonally extending member or bar 115. A second member or bar 116 is connected at its inner end to the ball 43 previously referred to as comprising part of the lower portion 42 of the socket that is provided on the depending U-frame 38 on the tractor. As best shown in Figure 2, the bars or members 115 and 116 are substantially coextensive in length and lie against each other along a line diagonally of the tractor and form one side of a triangle which has as its other sides the runner 86 and the transversely extending supporting member or bar 45. The member 115 carries a U-shaped guide 117 which embraces the member 116. This guide is located at the outer end of the release means. The inner end of the bar 115 is provided with a detent or lock portion 118 which is normally engaged by a latch 119 carried on the inner end of the bar 116. This latch is spring pressed by means of a pressure spring 120 and serves to retain the members or bars 115 and 116 in the position illustrated in the drawings. A second guide 121 is carried by the member 116 and, as shown in Figure 2, embraces both the detent end of the member 115 and the latch 118. These guides serve to support the members 115 and 116 in side-by-side relation and to prevent relative vertical movement therebetween. When the cutter-bar strikes an obstruction or is otherwise subjected to rearward pressure, it tends to move rearwardly about the vertical axis through the housing parts 48 and 74. This pressure gradually overcomes the pressure on the latch 119, and the member 115 is finally released to be extended relative to the member 116. Rearward swinging movement of the cutter-bar with respect to the supporting structure is limited by engagement between the detent portion 118 and the outer guide 117. The release means may be easily reconnected by the backing of the tractor with respect to the cutter-bar. This relative movement also includes, of course, forward movement of the cutter-bar with respect to the tractor. Since the members 115 and 116 are appropriately guided by the guides 117 and 121, the detent portion 118 is readily reengaged by the latch 119.

The provision of the ball and socket joints 113—114 and 116—43 contributes to the ability of the mower structure as a whole to have the floating movement previously referred to.

As previously stated, the cutting mechanism is movable or swingable vertically about a longitudinal axis provided between the pivot pin 103, the shaft 81, and bearing member or portion 111. The tractor is provided with means for effecting an adjustment of the cutting mechanism about this axis. Since the supporting structure, comprising the members 45 and 54 in the housing parts in the housing 47 and 54, is mounted on the ball and socket joints at the center and rear parts of the tractor, it will be apparent that this structure likewise may have vertical swinging movement with respect to the tractor body. It will be noted that the cutting mechanism and supporting structure have relative and independent vertical movement. For this reason the tractor includes lifting means capable of operating each independently or together.

As shown in Figures 1 and 2, the lifting means herein illustrated is of the pressure lifting type and comprises a pressure cylinder 122 carried on the supporting structure 28 at the forward end of the tractor body 20. The cylinder includes an upper rear portion 123 which is carried in the lower end of a tubular support 124. The upper end of the support 124 is mounted on the tractor by means of a bracket or support 125 carried by the U-shaped frame 38. The cylinder 122 is of the type operated by the exhaust of the tractor engine and is shown as including an exhaust pressure inlet 126. The particular details of the lifting mechanism comprise no part of the present invention and the illustrations and descriptions thereof are rather general and only for the purposes of facilitating the description of the mower structure in its entirety. A lifting structure of the particular type illustrated is disclosed in detail in assignee's copending application Serial No. 367,755 filed November 29, 1940.

The cylinder 122 includes a reciprocating piston, not shown, within the tubular support 124 and connected to one end of a lifting cable 127. The cable extends through an opening, not shown, in the tubular support 124 and is trained about a pulley 128 rotatably carried by the support. The lifting cable 127 extends downwardly and laterally outwardly and is connected at its outer end at 129 to the mower shoe 96, preferably by means of a connection on the laterally extending arm 108. An intermediate portion of the cable 127 passes over a pulley 130 rotatably carried by a support 131 rigidly secured to the upper portion of the housing part 48. It will be understood from the foregoing disclosure that rearward movement of the piston in the cylinder 122 serves to draw the cable 127 into the tubular support 124 so that an upward force is exerted on the cutting mechanism laterally outwardly of the pivot axis through the pivot pin 103 and the bearing portion 111 on the housing 74.

The upper end of the support 124 carries rigidly thereon an upstanding member 132. This member carries rotatably thereon a crank 133 which has a pinion or gear wheel, not shown, engageable with a notched quadrant or sector 134. The sector is pivoted at 135 on the support 124 and includes as an integral part thereof a forwardly and downwardly extending arm 136. The arm 136 is connected by a flexible connecting means in the form of a chain 137 to an eye 138 rigidly secured to an upper portion of the housing part 48. The detailed structure of the crank 133 and sector 134 is illustrated in the copending application referred to above. As previously stated, this last structure forms no part of the present invention. In operation, rotation of the pinion by the crank 133 moves the sector 134 and arm 136 about the pivot 135.

The connecting member 46 on the transverse member or bar 45 includes an upstanding ear 139 to which is connected the outer ends of a pair of laterally inwardly extending counter-balancing springs 140. The inner ends of these springs are connected to a bracket 141 rigidly carried by the U-frame 38. The springs perform the usual function of counter-balancing the mower structure.

The mower-supporting structure, comprising the housing parts and the supporting members or bars 45 and 54, is generally L-shaped, the legs of the L being formed by the bars 45 and 54. The housing parts comprise a supporting bracket located at the corner of the L-shaped structure. The housing part 48 also forms means by which the members or bars are rigidly secured together so that there is no relative movement between these bars. The only movement between the supporting structure and the tractor takes place about the axes provided by the two ball and socket joints, the one comprising the ball 44 on the inner end of the arm 43 and the socket parts 41 and 42, and the other comprising the ball member 58 formed on the rear bracket 59 and the socket parts 56 and 57 on the tubular supporting member 54. It is to be noted that the supporting member 54 is rigidly secured to the housing part 48. This arrangement enables the member 54 to serve as a combined bracing member and shaft-enclosing means. In addition, the arrangement makes possible the elimination of a universal joint in the drive shafting in the vicinity of the housing 48, thus providing a more economical and structurally sound frame means for the support of the mower or other agricultural implement. The provision of the member 54 as a brace eliminates other bracing structure so that the entire supporting structure is simplified to a large extent.

As previously stated, the forward end of the runner 86 is connected to the tractor or supporting structure by the releasable means comprising the bars or members 110 and 116. As was previously stated, these bars include at opposite ends thereof a pair of ball and socket joints, the one comprising the ball 113 on the runner 86 and the socket 114 on the member 115, and the other comprising the ball 43 on the bracket 42 and the socket at the inner end of the member 116. It will be further noted that the frame structure has its supporting points at the apices of a triangle, one point at the ball and socket joint on the U-frame 38, another point at the ball and socket joint 56—58 at the rear of the tractor, and the other at the ball and socket 113—114 at the forward end of the runner 86. The supporting structure just described consists of means by which the mower may be supported by the two bars 45 and 54. The releasable means comprises in addition a single other supporting connection. It will thus be seen that the entire structure is rigid and unitary in the respects desired and may be provided in an inexpensive and simple manner. Another important feature of the invention is the means providing the adjustment of the cutting mechanism with respect to the supporting structure about an axis transversely of the tractor. As previously described, the mower shoe 96 is carried on the outer end of the laterally extending arm 101. The connection between these two parts provides a pivot on a transverse axis. The rear end of the mower shoe is connected, by means of the slotted bracket 98, to the outer end of the laterally extending arm 108. In order that adjustment of the cutting mechanism may be effected, the nuts 102 and 109 on the arms 101 and 108, respectively, are loosened. With the outer end of the arm 101 serving as a pivot, the mower shoe may be adjusted vertically in either direction, the outer end of the arm 108 being free within the arcuate slot 106 in the bracket 98. After the parts have been moved to the desired position, the nuts 102 and 109 are tightened. This adjustment may be effected entirely independently of the mower-supporting structure as a whole. The disposition of the cutting mechanism as adjusted affects neither the driving mechanism nor the ability of the supporting structure to have relatively free vertical movement with respect to the tractor.

In addition to the foregoing features of construction, certain other details are present in greater or lesser degrees of importance, all of which will be apparent to those versed in the art to which the present invention pertains. Generally stated, the invention provides an improved structure for the mounting of an agricultural implement on a wheeled frame and particularly for the mounting of a mower of the highway type on a tractor or like vehicle. It will be understood, of course, that only a preferred embodiment of the invention has been illustrated and described, and that numerous modifications and alterations may be made therein without departing from the spirit and scope of the appended claims.

What is claimed is:

1. A mower comprising, in combination, a longitudinal wheeled frame, a bracket at one side of the frame between the front and rear wheels, cutting means carried by said bracket and extending laterally of the frame, a support element extending generally longitudinally of the frame, means rigidly connecting one end of said element to the bracket, means pivotally connecting the other end of the element to the frame, a second supporting element extending generally transversely of the frame, means rigidly connecting said one end of said element to the bracket, and means pivotally connecting the other end of said element to the frame, whereby the bracket and the supporting elements have movement as a unit relative to the frame about an axis passing through the aforesaid pivotal connecting means.

2. A mower comprising, in combination, a longitudinal wheeled frame including a drive element, a bracket at one side of the frame between the front and rear wheels, cutting means carried by said bracket and extending laterally of the frame, a support element extending generally longitudinally of the frame, means rigidly connecting one end of said element to the bracket, means pivotally connecting the other end of the element to the frame, a second supporting element extending generally transversely of the frame, means rigidly connecting said one end of said element to the bracket, means pivotally connecting the other end of said element to the frame, whereby the bracket and the supporting elements have movement as a unit relative to the frame about an axis passing through the aforesaid pivotal connecting means, drive mechanism carried by the bracket and connected to the cutting means, and drive means between the aforesaid drive element and the aforesaid drive mechanism including a driven member paralleling one of the supporting elements.

3. A mower comprising, in combination, a longitudinal wheeled frame, and including a drive element, a bracket at one side of the frame between the front and rear wheels, cutting means carried by said bracket and extending laterally of the frame, a support element extending generally longitudinally of the frame, means rigidly connecting one end of said element to the bracket, means pivotally connecting the other end of the element to the frame, a second supporting element extending generally transversely of the frame, means rigidly connecting said one end of said element to the bracket, means pivotally connecting the other end of said element to the frame, whereby the bracket and the supporting elements have movement as a unit relative to the frame about an axis passing through the aforesaid pivotal connecting means, one of said supporting elements being hollow, drive mechanism carried by the bracket and connected to the cutting means, and drive means between the aforesaid drive element and the aforesaid drive mechanism including a driving shaft enclosed in the hollow supporting element.

4. An agricultural implement comprising, in combination, a longitudinal wheeled frame, an implement-carrying structure carried by the first frame and comprising a pair of supporting elements each rigidly secured at one end to each other in generally right-angled relation to form an L-shaped frame, one supporting element extending generally longitudinally of the wheeled frame and the other element extending generally transversely of the wheeled frame, a pair of means respectively pivotally connecting the other ends of the supporting elements to the wheeled frame, and an implement connected to said structure.

5. A tractor-mounted mower comprising, in combination, a vehicle having a longitudinal frame carried on front and rear wheels, a mower-carrying structure carried by the tractor frame and comprising a support, a pair of supporting elements each rigidly secured at one end to the support in generally right-angled relation to form an L-shaped frame with the support at the corner of the L, one supporting element extending generally longitudinally of the wheeled frame and the other element extending generally transversely of the wheeled frame, a pair of means respectively pivotally connecting the other ends of the supporting elements to the wheeled frame, and mower cutting mechanism connected to the support.

6. An agricultural implement comprising, in combination, a longitudinal wheeled frame, an implement-carrying structure carried by the first frame and comprising a pair of supporting elements each rigidly secured at one end to each other in generally right-angled relation to form an L-shaped frame, one supporting element extending generally longitudinally of the wheeled frame and the other element extending generally transversely of the wheeled frame, a pair of means respectively pivotally connecting the other ends of the supporting elements to the wheeled frame, each means including a universal coupling, an implement, means connecting the implement to the implement-carrying structure, and means connecting the implement to one of the universal coupling means.

7. An agricultural implement comprising, in combination, a longitudinal wheeled frame, an implement carrying structure carried by the first frame and comprising a pair of supporting elements each rigidly secured at one end to each other in generally right-angled relation to form an L-shaped frame, one supporting element extending generally longitudinally of the wheeled frame and the other element extending generally transversely of the wheeled frame, a pair of means respectively pivotally connecting the other ends of the supporting elements to the wheeled frame, each means including a universal coupling, an implement, means movably connecting the implement to the structure for movement with respect thereto, and releasable means connecting the implement to one of the universal couplings to normally retain the implement against movement with respect to the structure.

8. A mower comprising in combination, a longitudinal frame, a mower adjacent the frame including a longitudinally extending member, an L-shaped supporting structure disposed with the legs of the L adjacent the frame and the corner adjacent the aforesaid member, means pivotally connecting each leg to the frame for movement of the structure about a generally horizontal axis, means pivotally connecting the structure at the corner of the L to one end portion of the aforesaid member for relative movement about a vertical axis, and releasable means connected between one leg of the supporting structure and the other end of the aforesaid member to restrain the aforesaid relative movement about the vertical axis between the supporting structure and the member.

9. A tractor-mounted mower comprising, in combination, a tractor having a longitudinal body carried on front and rear wheels and including a power take-off shaft at the rear of the body, a mower frame at one side of the body between the front and rear wheels and including a housing, a laterally extending cutter-bar carried by the housing and including cutting mechanism, drive gearing carried by and enclosed in the housing and operatively connected to the cutting mechanism, a frame member disposed transversely of the tractor, means rigidly securing one end of said member to the housing, means including a universal coupling pivotally connecting the other end of the member to the tractor body intermediate the front and rear wheels, a second frame member comprising a tube extending generally longitudinally of the tractor body rearwardly from the housing, means rigidly securing one end of the tube to the housing, means including a universal coupling pivotally connecting the other end of the tube to the tractor body to brace the housing, and means operatively connecting the tractor power take-off shaft and the drive gearing and including a shaft enclosed in the tube.

10. A tractor-mounted mower comprising, in combination, a tractor having a longitudinal body carried on front wheels and including a rear transversely extending axle housing carried on rear wheels, a mower structure including a bracket at one side of the body between the front and rear wheels, a ball and socket means carried by the under-side of the tractor body substantially in transverse alinement with the bracket, a transverse supporting member connected at one end to said means and rigidly secured at its other end to the bracket, a ball and socket means carried by the tractor rear axle housing substantially in longitudinal alinement with the bracket, and a longitudinal supporting member connected at one end to said means and rigidly secured at its other end to the bracket.

11. In a mower, a longitudinally extending ground-engaging runner, a gear housing rigidly carried by the runner, a bracket longitudinally spaced from the housing and rigidly carried by the runner, a pair of longitudinally spaced arms extending laterally from the runner, means pivotally connecting one end of one arm to the bracket on a longitudinal pivot axis, means mounting one end of the other arm on the housing on the same pivot axis, mower cutting mechanism extending laterally from the arms, means including a transverse pivot connecting the other end of one arm to the cutting mechanism, adjustable means connecting the other end of the other arm to the cutting mechanism for securing the cutting mechanism to the arm for adjustment relative to the arms about the transverse pivot, and drive gearing in the gear housing including a shaft rotatable on the aforesaid pivot axis and operatively connected to the cutting mechanism.

12. In a mower, a longitudinally extending support, means on the support providing a pair of longitudinally spaced pivots on a common longitudinal axis, a pair of generally parallel arms extending laterally from the support, means mounting the arms respectively on the pivots, a mower bar extending laterally from the arms, means mounting the bar on one arm for tilting about a transverse axis, and means adjustably connecting the bar and the other arm.

13. In a mower, a gear housing having upper and lower flanges, a longitudinally extending support having vertically spaced upper and lower portions respectively rigidly secured to the upper and lower flanges of the gear housing, drive gearing enclosed in the housing and including a drive shaft extending longitudinally from the housing between the upper and lower portions of the support, means on the housing forming a pivot on an axis coincident with the shaft axis, means on the support providing a coaxial pivot longitudinally spaced from the first pivot, and mower cutting mechanism carried on the pivots and including a driving connection to the aforesaid drive shaft.

14. In a mower, a longitudinally extending ground-engaging runner, a pair of brackets rigidly carried by the runner in longitudinally spaced relation, a pair of arms extending laterally from the runner, means respectively pivotally connecting the arms to the brackets on a longitudinal axis, a mower shoe paralleling the runner, means connecting the shoe and one arm for relative vertical movement and for movement together about the aforesaid longitudinal axis, and means adjustably connecting the shoe and other arm and adapted to adjustably secure the shoe in various positions with respect to the arms.

15. A mower, comprising, in combination, a longitudinal wheeled frame, a support extending longitudinally adjacent the frame, means connecting the support and the frame for relative vertical movement, a cutter-bar extending transversely from the support, and means mounting the cutter-bar on the support for tilting adjustment with respect to the support without altering the position of the support with respect to the frame, said means comprising a pair of arms extending laterally from the support, means mounting the cutter-bar on one arm for tilting adjustment relative thereto about a transverse axis, and means adjustably securing the bar to the other arm.

16. A tractor-mounted mower comprising, in combination, a tractor having a longitudinal body carried on front and rear wheels and including a transverse rear axle housing, mower structure connected to the tractor and comprising a laterally extending cutter-bar having its inner end adjacent one side of the tractor body and between the front and rear wheels and a pair of supporting arms rigidly secured together and connected to and diverging from the inner end of the cutter-bar toward spaced points, one an intermediate portion of the tractor body and the other on the rear axle housing, and means including a pair of universal couplings respectively pivotally connecting the supporting arms to the tractor at the aforesaid spaced points.

17. A tractor-mounted mower comprising, in combination, a tractor having a longitudinal body carried on front and rear wheels, a mower frame including a support at one side of the body intermediate the front and rear wheels of the tractor, a cutter-bar extending laterally from the support, means mounting the cutter-bar on the support for rearward swinging movement about a vertical axis with respect to the support, means mounting the support on the tractor body for vertical movement relative thereto comprising a pair of frame members connected to the support and extending toward the tractor body, means including a universal coupling connecting one frame member to the tractor body, means including a pair of universal couplings, one of which connects the other frame member to the tractor body, and releasable means connected between the other of the pair of couplings and the cutter-bar to hold the cutter-bar releasably against the aforesaid rearward movement.

18. A tractor-mounted mower comprising, in combination, a tractor having a body, mower structure connected to the tractor and comprising a laterally extending cutter-bar having its inner end adjacent the tractor and a pair of supporting arms connected to and diverging from the inner end of the cutter-bar toward spaced points on the tractor body, and means including a pair of universal couplings respectively pivotally connecting the supporting arms to the tractor body at the aforesaid spaced points.

19. A mower comprising, in combination, a longitudinal supporting frame, mower structure adjacent the frame comprising a support, a pair of brace members connected at one end to the support and extending toward spaced points on the frame, a ball and socket joint on the frame at one of said points and connecting one brace member, a pair of vertically alined ball and socket joints on the frame at the other point, means connecting one of said latter joints and the other brace member, a cutter-bar extending laterally from the support, means mounting the cutter-bar on the support for rearward swinging movement with respect thereto in a horizontal plane, and releasable means connecting the other of the vertically alined ball and socket joints and the cutter-bar to releasably restrain the cutter-bar against the aforesaid rearward swinging movement.

20. A tractor-mounted mower comprising, in combination, a tractor having a longitudinal body carried on front and rear wheels and including a transversely disposed rear frame part, a mower, and means mounting the mower on the tractor body for vertical movement with respect to the body including a pair of longitudinally and transversely spaced ball and socket joints, one located at a point on the body substantially midway between the front and rear wheels and the other located at the aforesaid transversely disposed rear frame part.

21. A tractor-mounted mower comprising, in combination, a tractor having a body, a mower, and means mounting the mower on the tractor body for vertical movement with respect to the body including a pair of longitudinally and transversely spaced universal couplings.

22. A tractor-mounted mower, comprising, in combination, a tractor having a longitudinal body, a mower structure including a support disposed adjacent the tractor, a plurality of attaching portions, a pair of supporting members connected to two of the attaching portions on the support, means connecting said members to the tractor, a ground-engaging runner connected to another of the attaching portions of the support, and mower cutting mechanism connected to another of the attaching portions of the support.

23. A tractor-mounted mower comprising, in combination, a tractor having a longitudinal body and including power means, mower structure including a support adjacent the tractor, said support including upper and lower housing parts connected together for relative movement about a vertical axis, a vertical shaft in the housing parts on said axis, drive gearing in the lower housing part and connected to the shaft, mower cutting mechanism carried by the lower housing, a brace member, means rigidly connecting the brace to the upper housing, means pivotally connecting the brace to the tractor, a second brace member comprising a tube rigidly secured at one end to the upper housing, means pivotally connecting the other end of the tube to the tractor, and means connecting the tractor power means and the vertical shaft in the housings including a shaft enclosed in the tube.

24. A mower comprising, in combination, a longitudinal carrying frame, a mower frame at one side of and below the carrying frame and including a brace member extending alongside the frame, means connecting one end of the brace to the carrying frame, cutting mechanism including a member disposed adjacent the frame, means connecting the other end of the brace and member in longitudinal alinement with the first connecting means, a second brace extending from the member at an angle to the first brace, means connecting the second brace and the member at a point thereon longitudinally spaced from and in longitudinal alinement with the aforesaid connecting means, means connecting the second brace and the carrying frame, a third brace connected at one end to the member substantially at the point of connection between the member and the first brace and at its other end to the carrying frame substantially at the point of connection between the carrying frame and the second brace.

RAYMORE D. MacDONALD.
SAMUEL E. HILBLOM.